United States Patent
Ono

Patent Number: 5,124,837
Date of Patent: Jun. 23, 1992

[54] FINDER OF REAL IMAGE TYPE

[75] Inventor: Nobuaki Ono, Tokyo, Japan

[73] Assignee: Ricoh Company, Ltd., Tokyo, Japan

[21] Appl. No.: 606,916

[22] Filed: Oct. 31, 1990

[30] Foreign Application Priority Data

Dec. 20, 1989 [JP] Japan ............... 1-330096

[51] Int. Cl.⁵ .................. G02B 23/14; G02B 9/12; G03B 13/02
[52] U.S. Cl. ..................... 359/423; 359/434; 359/784
[58] Field of Search ............ 350/561, 572, 474, 560, 350/570; 354/224, 225

[56] References Cited

U.S. PATENT DOCUMENTS

| | | | |
|---|---|---|---|
| 3,045,545 | 7/1962 | Korones et al. | 350/561 |
| 3,127,809 | 4/1964 | Denk | 350/561 |
| 3,989,349 | 11/1976 | Besenmatter et al. | 350/561 |
| 4,086,000 | 4/1978 | Cox et al. | 350/432 |
| 4,270,837 | 6/1981 | Baker | 350/572 |
| 4,387,967 | 6/1983 | Yamazaki et al. | 354/224 |
| 4,618,234 | 10/1986 | Ikari et al. | 354/225 |
| 4,964,686 | 10/1990 | Kato | 350/572 |

Primary Examiner—Jon W. Henry
Attorney, Agent, or Firm—Fish & Richardson

[57] ABSTRACT

A finder of a real image type has an objective lens unit having positive refracting power; a first condenser lens unit arranged in the vicinity of a focal face of the objective lens unit on an image side thereof and having positive refracting power; a relay lens unit arranged on an image side of the first condenser lens and inverting an object image provided by the objective lens and the first condenser lens rightward and leftward, and upward and downward; a second condenser lens unit having positive refracting power and arranged in the vicinity of a focal face provided on an image side of the relay lens unit by a combination system of the objective lens unit, the first condenser lens unit and the relay lens unit; and an eyepiece unit arranged on an image side of the second condenser lens unit to observe an image formed by a combination system from the objective lens unit to the second condenser lens unit. The relay lens unit is constructed by one positive lens and two negative lenses. A focal length $f_{3k}$ and an Abbe number $\nu_{3k}$ ($k=1$ to 3) of a k—th lens in the relay lens unit from an object side thereof, and a combined focal length $f_R$ of the relay lens unit satisfy the following conditions.

$$-1.5 < f_{32}/f_R < -0.5 \tag{I}$$

$$-3.0 < f_{33}/f_R < -1.5 \tag{II}$$

$$\nu_{31} - (\nu_{32} + \nu_{33})/2 > 20 \tag{III}$$

1 Claim, 4 Drawing Sheets

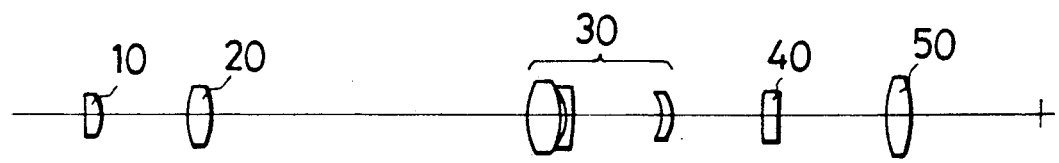
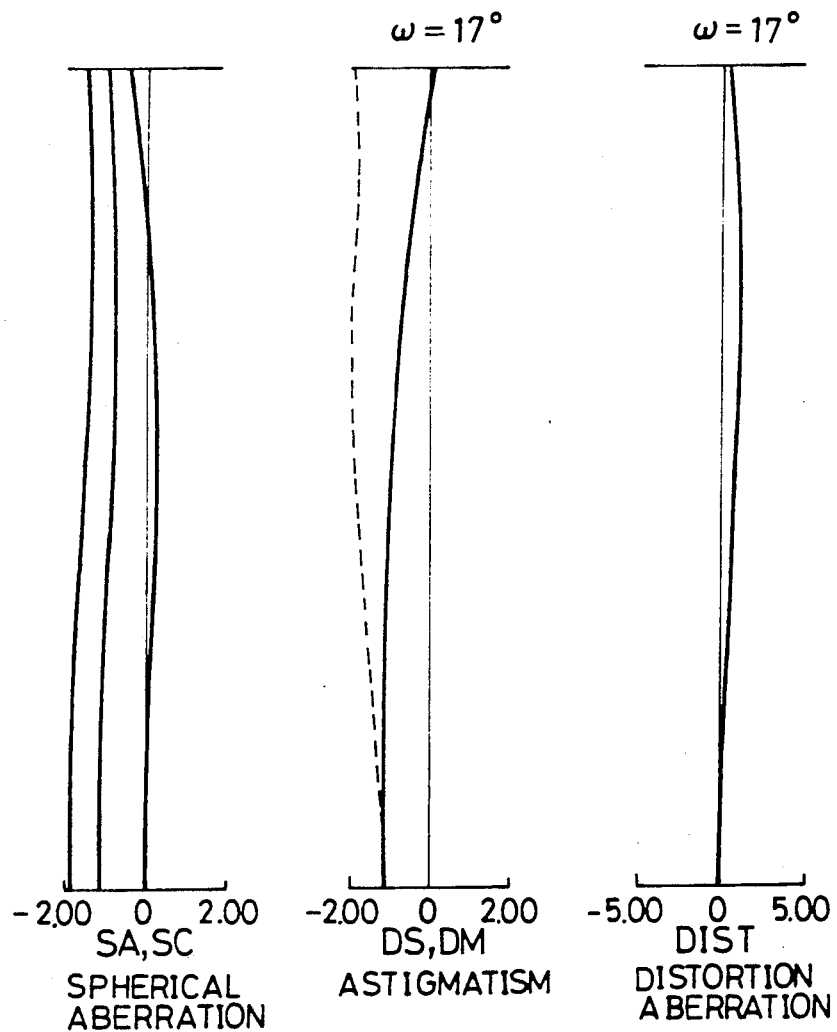

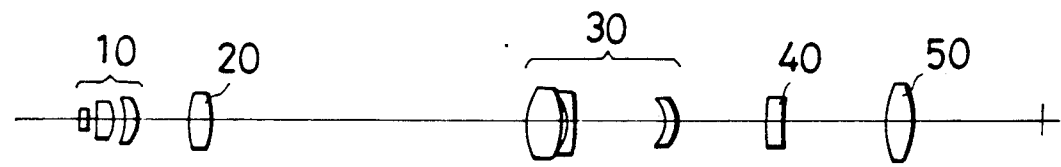
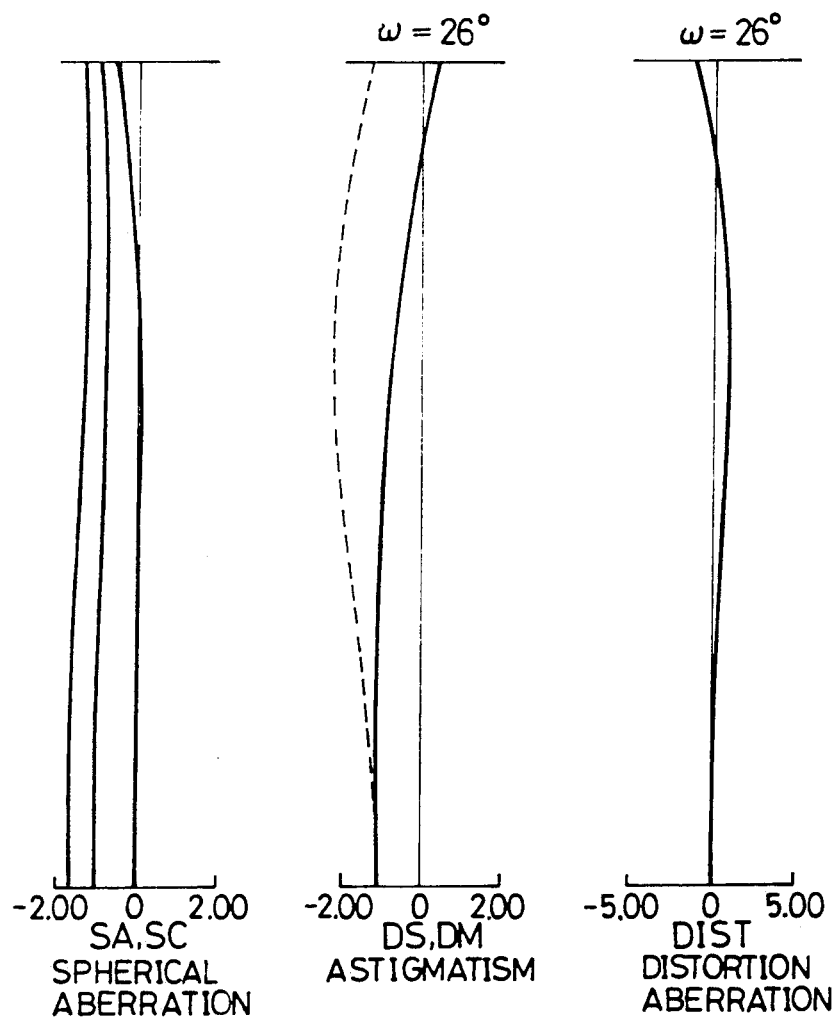

FINDER OF REAL IMAGE TYPE

BACKGROUND OF THE INVENTION

1. Field of the Invention

The present invention relates to a finder of a real image type having lens units.

2. Description of the Related Art

Various kinds of finders of a real image type are known as a finder for a still camera or a video camera, etc. For example, see Japanese Patent Application Laying Open (KOKAI) No. 63-81415.

However, such finders have no simplified structure and no various aberrations are preferably corrected in such finders.

SUMMARY OF THE INVENTION

It is therefore an object of the present invention to provide a novel finder of a real image type having a simplified structure and preferably correcting various aberrations.

The above object of the present invention can be achieved by a finder of a real image type comprising an objective lens unit having positive refracting power; a first condenser lens unit arranged in the vicinity of a focal face of the objective lens unit on an image side thereof and having positive refracting power; a relay lens unit arranged on an image side of the first condenser lens and inverting an object image provided by the objective lens and the first condenser lens rightward and leftward, and upward and downward; a second condenser lens unit having positive refracting power and arranged in the vicinity of a focal face provided on an image side of the relay lens unit by a combination system of the objective lens unit, the first condenser lens unit and the relay lens unit; and an eyepiece unit arranged on an image side of the second condenser lens unit to observe an image formed by a combination system from the objective lens unit to the second condenser lens unit; the relay lens unit being constructed by one positive lens and two negative lenses; and a focal length $f_{3k}$ and an Abbe number $\nu_{3k}$ ($k = 1$ to 3) of a $k$-th lens in the relay lens unit from an object side thereof, and a combined focal length $f_R$ of the relay lens unit satisfying the following conditions.

$$-1.5 < f_{32}/f_R < -0.5 \quad \text{(I)}$$

$$-3.0 < f_{33}/f_R < -1.5 \quad \text{(II)}$$

$$\nu_{31} - (\nu_{32} + \nu_{33})/2 > 20 \quad \text{(III)}$$

In accordance with the above structure, the finder of a real image type has a simplified structure and preferably corrects various aberrations.

Further objects and advantages of the present invention will be apparent from the following description of the preferred embodiments of the present invention as illustrated in the accompanying drawings.

BRIEF DESCRIPTION OF THE DRAWINGS

FIGS. 2a to 5b are views for showing a lens construction and aberrations in the finder of a real image type in each of respective embodiments of the present invention.

DESCRIPTION OF THE PREFERRED EMBODIMENTS

The preferred embodiments of a finder of a real image type in the present invention will next be described in detail with reference to the accompanying drawings.

Figure 1:
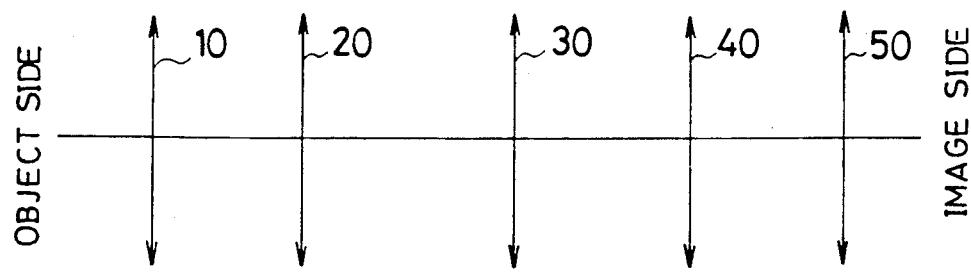
FIG. 1 is a view for explaining the basic construction of lenses in a finder of a real image type in the present invention.

As shown in FIG. 1, a finder of a real image type in the present invention has an objective lens unit 10, a first condenser lens unit 20, a relay lens unit 30, a second condenser lens unit 40 and an eyepiece unit 50 sequentially arranged from an object side of the finder toward an image side thereof. All these five units have positive refracting power.

The first condenser lens unit 20 is arranged in the vicinity of a focal face of the objective lens unit 10 on an image side thereof.

The relay lens unit 30 is arranged on an image side of the first condenser lens 20 and inverts an object image provided by the objective lens 10 and the first condenser lens 20 rightward and leftward, and upward and downward.

The second condenser lens unit 40 has positive refracting power and is arranged in the vicinity of a focal face provided on an image side of the relay lens unit 30 by a combination system composed of the objective lens unit 10, the first condenser lens unit 20 and the relay lens unit 30.

The eyepiece 50 is arranged on an image side of the second condenser lens unit 40 to observe an image formed by a combination system from the objective lens unit 10 to the second condenser lens unit 40.

The relay lens unit 30 is constructed by one positive lens and two negative lenses. A focal length $f_{3k}$ and an Abbe number $\nu_{3k}$ ($k = 1$ to 3) of a $k$-th lens in the relay lens unit 30 from an object side thereof, and a combined focal length $f_R$ of the relay lens unit 30 satisfy the following conditions.

$$-1.5 < f_{32}/f_R < -0.5 \quad \text{(I)}$$

$$-3.0 < f_{33}/f_R < -1.5 \quad \text{(II)}$$

$$\nu_{31} - (\nu_{32} + \nu_{33})/2 < 20 \quad \text{(III)}$$

Since the relay lens unit is constructed by one positive lens and two negative lenses and the conditions (I) to (III) are satisfied, it is possible to restrain a Petzval's sum from being increased and restrain chromatic aberration on the optical axis of a lens system from being caused.

The conditions (I) and (II) are conditions for suitably holding the Petzval's sum. When the ratios in these conditions (I) and (II) exceed upper limits thereof, the Petzval's sum is reduced, but no balance of aberration on the optical axis and aberration outside the optical axis can be preferably held. When the ratios in the conditions (I) and (II) exceed lower limits thereof, the Petzval's sum is increased so that no field curvature can be preferably corrected.

The condition (III) is a condition for preferably correcting chromatic aberration. The chromatic aberration on the optical axis is corrected by setting an average value of Abbe numbers of second and third lenses in the relay lens unit to be smaller than an Abbe number of a first lens. When the condition (III) is not satisfied, no chromatic aberration can be preferably corrected.

Four concrete embodiments of a finder of a real image type in the present invention will next be described.

In the respective embodiments, reference numeral $r_i$ designates a radius of curvature of an i−th lens face counted from the object side. Reference numeral $d_i$ designates a distance with respect to the i−th lens face counted from the object side. Reference numeral $n_j$ designates a refractive index of a j−th lens counted from the object side. Reference numeral $v_j$ designates an Abbe number on line d with respect to the j−th lens counted from the object side.

In the respective embodiments, an aspherical surface is used as some lens faces. In the following description with respect to the aspherical surface, reference numeral Z designates an optical axis direction, Y a direction perpendicular to the optical axis, r a radius of curvature of a lens on the optical axis thereof, K a conical constant, and A, B, C and D designate aspherical coefficients of higher orders. In this case, as is well known, the aspherical surface is provided by rotating a curve provided by the following formula around the optical axis.

$$Z = [(1/r)Y^2/\{1 + \sqrt{1 - (1 - K)(1/r^2)Y^2}\}] + AY^4 + BY^6 + CY^8 + CY^{10}$$

With respect to the aspherical surface, the above radius $r_i$ of curvature is a radius of curvature of a lens on the optical axis thereof and provides the conical constant K and the aspherical coefficients A, B, C and D of higher orders. A power with respect to each of the aspherical coefficients of higher orders is designated by (E numeral). The numeral after alphabet E shows an absolute value of a minus numeral. For example, E13 shows $10^{-13}$ and this exponential value is multiplied by a numeral located before the exponential value as shown in the following description.

In the embodiments 1 and 2, an entire finder of a real image type is constructed by seven lenses. In the embodiments 3 and 4, an entire finder of a real image type is constructed by nine lenses.

EMBODIMENT 1

| i | $r_i$ | $d_i$ | j | $n_j$ | $v_j$ |
|---|---|---|---|---|---|
| 1 | −77.474 | 3.00 | 1 | 1.492 | 57.8 |
| 2 | −7.238 | 14.73 | | | |
| 3 | 19.032 | 4.00 | 2 | 1.492 | 57.8 |
| 4 | −19.032 | 53.51 | | | |
| 5 | 8.814 | 5.84 | 3 | 1.492 | 57.8 |
| 6 | −13.535 | 0.48 | | | |
| 7 | −10.286 | 1.50 | 4 | 1.585 | 29.3 |
| 8 | −61.612 | 11.60 | | | |
| 9 | −8.423 | 1.50 | 5 | 1.585 | 29.3 |
| 10 | −12.738 | 19.77 | | | |
| 11 | 31.996 | 3.00 | 6 | 1.492 | 57.8 |
| 12 | ∞ | 17.47 | | | |
| 13 | 15.667 | 4.00 | 7 | 1.492 | 57.8 |
| 14 | −21.208 | | | | |

Conditional values: $f_{32}/f_R = -0.933$, $f_{33}/f_R = -2.132$, $v_{31} - (v_{32} + v_{33})/2 = 28.5$ Aspherical surfaces

| i | K | A | B | C | D |
|---|---|---|---|---|---|
| 1 | −52 | −1.64E4 | −3.19E5 | 7.73E7 | −2.92E8 |
| 2 | −0.1 | 1.83E4 | −1.74E5 | −7.95E7 | −2.54E9 |
| 5 | 0.0065 | 2.31E6 | 5.47E8 | 1.34E9 | 3.47E11 |
| 6 | 0.035 | −2.18E6 | −6.12E8 | −1.81E9 | −5.66E11 |
| 7 | −0.065 | −1.74E5 | 1.01E6 | 2.94E8 | −1.22E10 |
| 8 | −141.7 | 3.22E5 | 1.38E6 | −2.31E8 | 2.53E10 |
| 9 | 0.66 | −8.33E4 | −9.34E5 | −1.27E6 | −1.31E7 |
| 10 | −7.79 | −1.15E3 | −5.68E5 | −1.2 E7 | 1.15E8 |
| 13 | −2.24 | −4.62E5 | −3.43E7 | 1.6 E9 | 2.96E11 |
| 14 | 0.67 | −9.31E6 | 6.13E9 | 5.2 E9 | −3.92E11 |

EMBODIMENT 2

| i | $r_i$ | $d_i$ | j | $n_j$ | $v_j$ |
|---|---|---|---|---|---|
| 1 | −77.474 | 3.00 | 1 | 1.492 | 57.8 |
| 2 | −7.238 | 14.51 | | | |
| 3 | 19.380 | 3.64 | 2 | 1.492 | 57.8 |
| 4 | −19.380 | 54.90 | | | |
| 5 | 9.851 | 6.20 | 3 | 1.48749 | 70.21 |
| 6 | −14.421 | 0.95 | | | |
| 7 | −10.392 | 1.50 | 4 | 1.585 | 29.3 |
| 8 | −32.328 | 15.15 | | | |
| 9 | −4.029 | 1.72 | 5 | 1.585 | 29.3 |
| 10 | −5.454 | 14.98 | | | |
| 11 | 31.996 | 3.00 | 6 | 1.492 | 57.8 |
| 12 | ∞ | 17.47 | | | |
| 13 | 15.667 | 4.00 | 7 | 1.492 | 57.8 |
| 14 | −21.208 | | | | |

Conditional values: $f_{32}/f_R = -1.167$, $f_{33}/f_R = -2.065$, $v_{31} - (v_{32} + v_{33})/2 = 40.91$ Aspherical surfaces

| i | K | A | B | C | D |
|---|---|---|---|---|---|
| 1 | −50 | −1.6 E4 | −3.2 E5 | 8.0 E7 | |
| 2 | −0.1 | 1.8 E4 | −1.7 E5 | −8.0 E7 | |
| 7 | 0.1 | −2.9 E5 | 9.7 E7 | 2.9 E8 | −4.2 E10 |
| 8 | −7.5 | 2.3 E5 | 8.3 E7 | −7.1 E9 | −4.2 E10 |
| 9 | 0.2 | 1.5 E3 | −3.4 E5 | −2.4 E6 | −1.8 E8 |
| 10 | −2.9 | −1.1 E3 | −1.5 E5 | −8.3 E7 | 3.0 E9 |
| 13 | −2.1 | −4.3 E5 | −3.4 E7 | 1.9 E9 | |
| 14 | 0.8 | −1.2 E5 | 1.0 E8 | 6.0 E9 | |

EMBODIMENT 3

| i | $r_i$ | $d_i$ | j | $n_j$ | $v_j$ |
|---|---|---|---|---|---|
| 1 | −17.654 | 1.80 | 1 | 1.585 | 29.3 |
| 2 | −21.789 | 1.00 | | | |
| 3 | 77.474 | 3.0 | 2 | 1.492 | 57.8 |
| 4 | −7.238 | 1.80 | | | |
| 5 | −9.851 | 2.26 | 3 | 1.492 | 57.8 |
| 6 | −5.03 | 9.08 | | | |
| 7 | 19.032 | 4.00 | 4 | 1.492 | 57.8 |
| 8 | −19.032 | 53.51 | | | |
| 9 | 8.814 | 5.84 | 5 | 1.492 | 57.8 |
| 10 | −13.535 | 0.48 | | | |
| 11 | −10.286 | 1.50 | 6 | 1.585 | 29.3 |
| 12 | −61.612 | 11.60 | | | |
| 13 | −8.423 | 1.50 | 7 | 1.585 | 29.3 |
| 14 | −12.738 | 19.77 | | | |
| 15 | 31.996 | 3.00 | 8 | 1.492 | 57.8 |
| 16 | ∞ | 17.47 | | | |
| 17 | 15.667 | 4.00 | 9 | 1.492 | 57.8 |
| 18 | −21.208 | | | | |

Conditional values: $f_{32}/f_R = -0.933$, $f_{33}/f_R = -2.132$, $v_{31} - (v_{32} + v_{33})/2 = 28.5$ Aspherical surfaces

| i | K | A | B | C | D |
|---|---|---|---|---|---|
| 1 | 30 | 1.0 E3 | 2.5 E3 | −1.0 E3 | |
| 2 | 20 | −1.0 E4 | 6.4 E4 | −1.7 E4 | |
| 3 | −52 | −1.64E4 | −3.19E5 | 7.73E7 | −2.92E8 |
| 4 | −0.1 | 1.83E4 | −1.74E5 | −7.95E7 | −2.54E9 |
| 6 | −1.1 | 3.0E5 | −3.0 E6 | −1.5E6 | |
| 9 | 0.0065 | 2.31E6 | 5.47E8 | 1.34E9 | 3.47E11 |
| 10 | 0.035 | −2.18E6 | −6.12E8 | −1.81E9 | −5.66E11 |
| 11 | −0.065 | −1.74E5 | 1.01E6 | 2.94E8 | −1.22E10 |
| 12 | −141.7 | 3.22E5 | 1.38E6 | −2.31E8 | 2.53E10 |
| 13 | 0.66 | −8.33E4 | −9.34E5 | −1.27E6 | −1.31E7 |
| 14 | −7.79 | −1.15E3 | −5.68E5 | −1.2 E7 | 1.15E8 |
| 17 | −2.24 | −4.62E5 | −3.43E7 | −1.6 E9 | 2.96E11 |
| 18 | 0.67 | −9.31E6 | 6.13E9 | 5.2 E9 | −3.92E11 |

EMBODIMENT 4

| i | $r_i$ | $d_i$ | j | $n_j$ | $\nu_j$ |
|---|---|---|---|---|---|
| 1 | −17.654 | 1.80 | 1 | 1.585 | 29.3 |
| 2 | −21.789 | 1.00 | | | |
| 3 | 77.474 | 3.0 | 2 | 1.492 | 57.8 |
| 4 | −7.238 | 1.80 | | | |
| 5 | −9.851 | 2.26 | 3 | 1.492 | 57.8 |
| 6 | −5.03 | 8.86 | | | |
| 7 | 19.38 | 3.64 | 4 | 1.492 | 57.8 |
| 8 | −19.38 | 54.90 | | | |
| 9 | 9.851 | 6.20 | 5 | 1.48749 | 70.21 |
| 10 | −14.421 | 0.95 | | | |
| 11 | −10.392 | 1.50 | 6 | 1.585 | 29.3 |
| 12 | −32.328 | 15.15 | | | |
| 13 | −4.029 | 1.72 | 7 | 1.585 | 29.3 |
| 14 | −5.454 | 14.98 | | | |
| 15 | 31.996 | 3.00 | 8 | 1.492 | 57.8 |
| 16 | ∞ | 17.47 | | | |
| 17 | 15.667 | 4.00 | 9 | 1.492 | 57.8 |
| 18 | −21.208 | | | | |

Conditional values: $f_{32}/f_R = -1.167$, $f_{33}/f_R = -2.065$.
$\nu_{31} - (\nu_{32} + \nu_{33})/2 = 40.91$

Aspherical surfaces

| i | K | A | B | C | D |
|---|---|---|---|---|---|
| 1 | 30 | | 2.5 E3 | −1.0 E3 | |
| 2 | 20 | −1.0 E4 | 6.4 E4 | −1.7 E4 | |
| 3 | −50 | −1.6 E4 | −3.2 E5 | 8.0 E7 | |
| 4 | −0.1 | 1.8 E4 | −1.7 E5 | −8.0 E7 | |
| 6 | −1.1 | 3.0E5 | −3.0 E6 | −1.5E6 | |
| 11 | 0.1 | −2.9 E5 | 9.7 E7 | 2.9 E8 | −4.2 E10 |
| 12 | −7.5 | 2.3 E5 | 8.3 E7 | −7.1 E9 | −4.2 E10 |
| 13 | 0.2 | 1.5 E3 | −3.4 E5 | −2.4 E6 | 1.8 E8 |
| 14 | −2.9 | −1.1 E3 | −1.5 E5 | −8.3 E7 | 3.0 E9 |
| 17 | −2.1 | −4.3 E5 | −3.4 E7 | 1.0 E9 | |
| 18 | 0.8 | −1.2 E5 | 1.0 E8 | 6.0 E9 | |

Figure 2A:
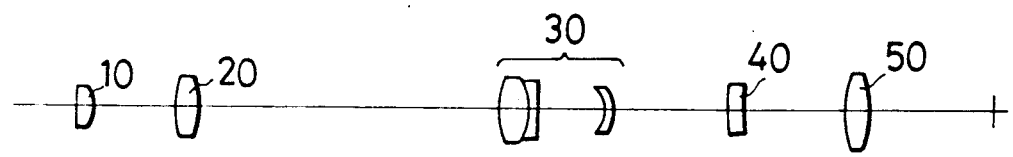
Figure 2B:
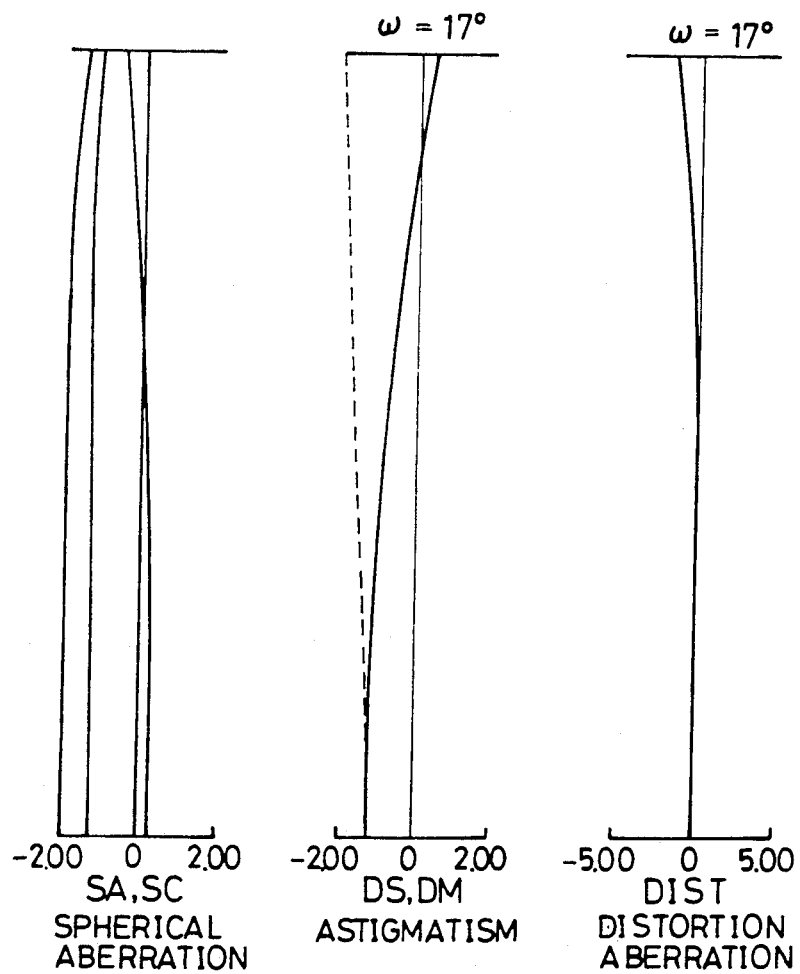
Figure 4A:
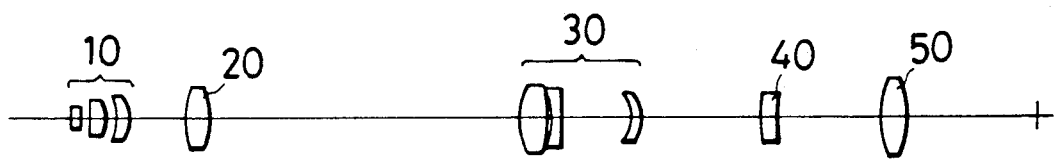
Figure 4B:
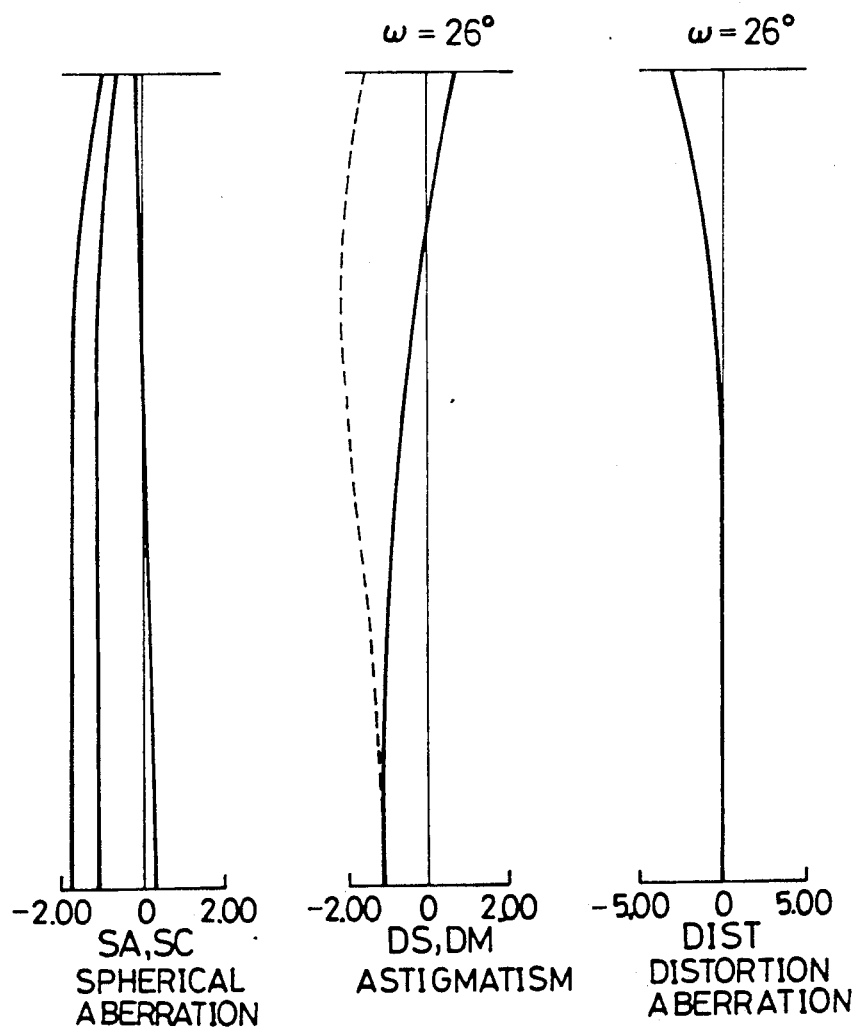

FIGS. 2a and 2b respectively show a lens construction and an aberration diagram in the finder of a real image type in the embodiment 1. FIGS. 3a and 3b respectively show a lens construction and an aberration diagram in the finder of a real image type in the embodiment 2. FIGS. 4a and 4b respectively show a lens construction and an aberration diagram in the finder of a real image type in the embodiment 3. FIGS. 5a and 5b respectively show a lens construction and an aberration diagram in the finder of a real image type in the embodiment 4. In FIGS. 2a, 3a, 4a and 5a, each of reference numerals 10 to 50 designates a lens unit designated by the same reference numeral as that in FIG. 1.

As mentioned above, in accordance with the present invention, it is possible to provide a novel finder of a real image type having a simplified structure mentioned above. In this finder, various aberrations are preferably corrected as shown in the aberration diagrams in the respective embodiments. In the embodiments 3 and 4, a half angle of view can be set to 26 degrees so that it is possible to set a very wide angle of view. Further, in the respective embodiments, the respective lenses can be constructed by materials having low refractive indexes so that the lenses can be made of plastic, thereby reducing the cost of the finder.

Many widely different embodiments of the present invention may be constructed without departing from the spirit and scope of the present invention. It should be understood that the present invention is not limited to the specific embodiments described in the specification, except as defined in the appended claims.

What is claimed is:

1. A finder of a real image type comprising:
   an objective lens unit having positive refracting power;
   a first condenser lens unit arranged in the vicinity of a focal face of the objective lens unit on an image side thereof and having positive refracting power;
   a relay lens unit arranged on an image side of the first condenser lens and inverting an object image provided by said objective lens and the first condenser lens rightward and leftward, and upward and downward;
   a second condenser lens unit having positive refracting power and arranged in the vicinity of a focal face provided on an image side of the relay lens unit by a combination system of said objective lens unit, the first condenser lens unit and the relay lens unit; and
   an eyepiece unit arranged on an image side of the second condenser lens unit to observe an image formed by a combination system from said objective lens unit to the second condenser lens unit;
   said relay lens unit being constructed by one positive lens and two negative lenses; and
   a focal length $f_{3k}$ and an Abbe number $\nu_{3k}$ (k=1 to 3) of a k−th lens in said relay lens unit from an object side thereof, and the combined focal length $f_R$ of the relay lens unit satisfying the following conditions, $$-1.5 < f_{32}/f_R < -0.5 \qquad \text{(I)}$$

$$-3.0 < f_{33}/f_R < -1.5 \qquad \text{(II)}$$

$$\nu_{31} - (\nu_{32} + \nu_{33})/2 > 20. \qquad \text{(III)}$$

* * * * *